June 8, 1965 J. N. CECIL 3,188,648
METHOD OF TAPE RECORDING PULSES OCCURRING
IN VERY NEAR COINCIDENCE
Filed Feb. 3, 1960 2 Sheets-Sheet 1

INVENTOR.
JOSEPH N. CECIL
BY
Robert K. Schumacher
ATTORNEY

INVENTOR.
JOSEPH N. CECIL
BY
Robert K. Schumacher
ATTORNEY 3,188,648

METHOD OF TAPE RECORDING PULSES OCCURRING IN VERY NEAR COINCIDENCE

Joseph N. Cecil, Tulsa, Okla., assignor, by mesne assignments, to Dresser Industries, Inc., Dallas, Tex., a corporation of Delaware Filed Feb. 3, 1960, Ser. No. 6,426
5 Claims. (Cl. 346—74)

The present invention relates to recording systems, and more particularly to a method and apparatus of separately recording on a movable magnetic medium, pulses occurring in time coincidence or very near coincidence regardless of the speed of the medium.

The rate at which information may be recorded on a single channel of magnetic tape is a function of the air gap of the magnetic head and the speed of the tape. In order to preserve distinct units of information; that is, to prevent distinct units of information from overlapping on the magnetic record, a width of tape equal to the width of the air gap of the recording head, must be moved past the gap during each interval of time between the units of information applied to the head. Obviously, one method of increasing the rate at which information may be recorded is to increase the speed of the tape and/or reduce the width of the air gap in the head. Physical limitations restrict the minimum width of the air gap which may be realized and therefore, the normal procedure for increasing the rate at which information may be recorded is to increase the speed of the tape. In systems where information is received at irregular intervals, the utilization of high speed tapes is quite uneconomical since great quantities of tape are consumed in recording relatively small amounts of information. Various techniques have been developed for minimizing the amount of tape utilized in high speed systems and specifically, systems have been devised in which the tape is run at slow speeds except when signals are received at which time the tape is run at high speeds. In many pulse systems and in systems with which the present invention is primarily concerned, the pulse information is of a completely random nature with long intervals of no pulse information followed by several pulses occurring in rapid succession. If the tape is run normally at slow speeds and then brought up to speed upon receipt of pulse information, many of the initial pulses would be lost during the interval required to bring the apparatus up to speed. In a specific example of the type of system with which the apparatus of the present invention is to be employed, pulses derived from a radiation detector are recorded for subsequent application to a counting rate meter or a display device. In such systems, the pulse information is of an extremely random nature and in many instances pulses occur at widely separate times whereas at other times two or three pulses may be received within a two microsecond interval. Pulses occurring in the two microsecond interval obviously cannot be recorded by tapes which are run at relatively slow speeds. In order to record such information in a normal, single-channel tape apparatus, the speed at which the tape is run would have to be extremely high. If a system were employed in which the tape is normally run at a slow speed and then attempted to be brought to speed in the presence of information, it is seen that less than two microseconds are allowed for the machine to be brought up to full speed. It is not believed to be possible, in the present state of the motor art, to provide a relatively high inertia system which can go from slow speed to full speed in two microseconds.

It is therefore an object of the present invention to provide a recording apparatus which may record random pulses on a relatively slowly moving magnetic tape, which pulses occur at very rapid rates of the order of magnitude of a microsecond.

It is another object of the present invention to provide a method and apparatus for recording, on magnetic tape, pulses occurring in coincidence or in very near coincidence.

Still another object of the present invention is to provide a multichannel magnetic recording apparatus in which pulse information is recorded in one channel and simultaneously switches the succeeding pulses to successive channels so that each channel records only a single pulse over a given period of time.

In accordance with the present invention, a multichannel tape recording apparatus is provided in which only one channel at a time is connected to a source of pulse information. In one embodiment of the invention, each pulse is recorded in a channel and apparatus responsive to the pulse switches in a subsequent channel and switches out the original channel so that the next unit of information is recorded in a channel different from the first pulse. This basic unit may take two forms. In a first form, the pulses are sequentially and successively recorded in alternate channels regardless of the interval between pulses. In a second form of the present invention, the pulses are all recorded in a single channel unless two pulses occur in the interval required to record the first pulse. In this case, the first channel is disconnected from the pulse source, and the second channel is switched in. After the interval required for recording in the first channel, the first channel is again connected to the pulse source and the second channel is disconnected. The number of parallel recording channels employed depends entirely upon the maximum number of pulses expected to be received during the interval required to record a single pulse. If a tape is travelling at 1.875 inches per second, approximately 200 microseconds are required to record a one microsecond pulse with a standard recording head. If, for example, it is expected that a maximum of six pulses will be received in a 200 microsecond interval, then six recording channels are required to record the pulses. A ring counter may be employed to control the switching of the connection of the recording channels to the pulse source in response to receipt of each pulse. The pulses are applied to the counter and the output signals of the ring counter may be recorded directly or may be employed to control gates for channelizing input pulses to the appropriate channels. In a specific illustrated embodiment of the invention, a four-channel recorder is illustrated for the reason that the apparatus is primarily intended to be utilized with a radiation detector in a specific environment and in this specific environment, which is a well bore, it is anticipated that the probability of more than four pulses occurring within a 200 microsecond interval is substantially negligible.

It is possible that pulses will be received in time coincidence, and a pulse produced by such an occurrence is of greater amplitude than that of a single standard pulse. An amplitude discriminator may be employed to produce an output pulse if the amplitude of the input pulse is above a predetermined minimum, say one and a quarter times a standard pulse. The output pulse from the discriminator may be fed to the counter circuit at a predetermined time after application to the counter circuit of the original pulse and in consequence, two pulses are recorded even though only one pulse has been received. The counter circuit described above may be replaced by a counter employing a plurality of monostable multivibrators each having a period approximately equal to the period required for each channel to record. In this way, all pulses are recorded in a single channel except those which occur within the recording interval of a single channel and by employing four such channels a complete coverage of the interval is provided in the environment described above.

It can be seen from the above that, in the apparatus of the present invention, the pulses to be recorded also are employed to control the channelizing of a subsequent pulse and therefore, the pulse serves both as a unit of information and as a unit of control information. This feature of the present invention is of great importance since in random pulse systems, it is not possible to provide channel sequencing pulses or synchronizing pulses as is the case in systems where the rate at which information is to be received and the actual times of occurrences of information are known in advance.

It is therefore a primary object of the present invention to provide a method and apparatus for recording random pulses occurring in very near or actual time coincidence on a relatively slowly moving magnetic recording medium without a loss of pulse information.

It is another object of the present invention to provide a random pulse recording system in which each incoming pulse is recorded and which is employed to control a circuit so as to channel a subsequent unit of information occurring within a predetermined interval after occurrence of the original pulse to a further recording channel.

The above and still further objects, features and advantages of the present invention will become apparent upon consideration of the following detailed description of one specific embodiment thereof, especially when taken in conjunction with the accompanying drawings, wherein.

Figure 1:
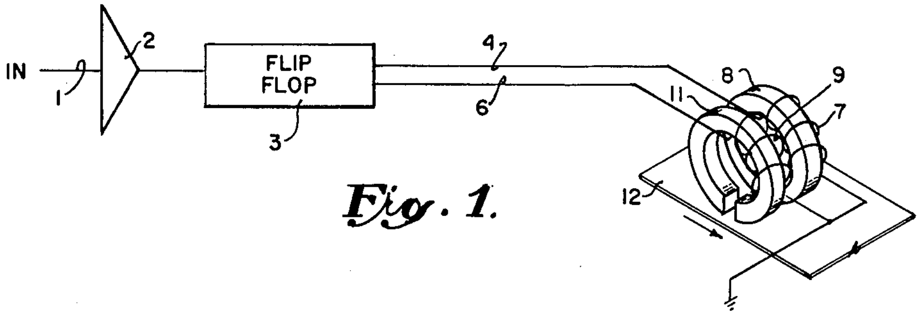
FIGURE 1 is a schematic partial circuit and partial block diagram of a basic system of the present invention.

Referring specifically to FIGURE 1 of the accompanying drawings, there is illustrated a simple, two-channel recording system for recording successive pulses in alternate information channels. Pulses to be recorded appear on an input lead 1 and are amplified by an amplifier 2 which supplies output pulses to a flip-flop circuit 3. The flip-flop circuit 3 is provided with two output leads 4 and 6; the output lead 4 being connected to a winding 7 of a magnetic recording head 8, and the lead 6 being connected to a winding 9 of the recording head 11. The recording heads 8 and 11 are adapted to record in two distinct parallel channels of a magnetic tape 12 which is moved at a predetermined uniform rate. The stages of the flip-flop 3 are A.C. coupled to the leads 4 and 6 so that pulses rather than continuous signals are supplied to the windings 7 and 9 of the heads 8 and 11 respectively.

In operation, output pulses from the amplifier 2 produce switching of the flip-flop 3 between its two states of conduction. Upon the stage to which the lead 4 is coupled becoming non-conductive, a sharp pulse is applied to the lead 4 and concurrently therewith the stage to which the stage 6 is coupled becomes conductive. Upon the appearance of a second pulse on the lead 1, the states of conduction of the flip-flop 3 are interchanged and the stage to which the lead 6 is connected becomes non-conductive and a short positive pulse appears on this lead. In consequence, the flip-flop 3 serves as a switching device to direct the successive incoming pulses alternately to the heads 8 and 11. The flip-flop 3 also serves as a pulse sharpening device which converts the pulses from rather long signals to very short signals.

The resolving time of the apparatus illustrated in FIGURE 1 is determined by the switching time of the flip-flop 3 and in presently available circuits a complete transition of a flip-flop from one state to another may be accomplished in one-half of a microsecond. Consequently, the apparatus illustrated in FIGURE 1 is capable of resolving pulses occurring at one-half miscrosecond intervals even though the time required for each of the heads 8 and 11 to record a pulse may be considerably greater. In a specific example, if the tape speed is, for instance, 1.875 inches per second, 200 microseconds are required for each of the heads to record a pulse on the tape 12.

Figure 2:
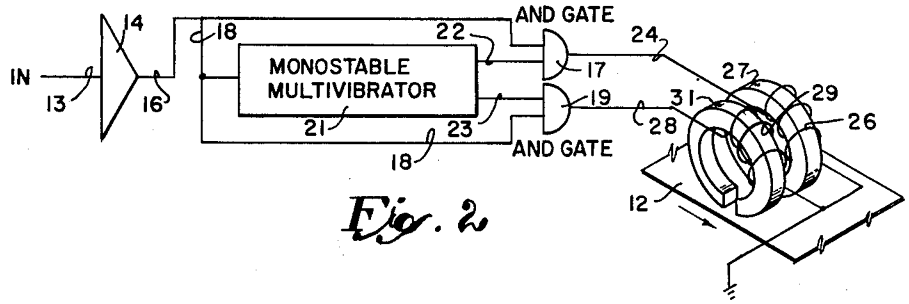
FIGURE 2 is a partial schematic and partial block diagram of a modification of the circuit of FIGURE 1.

The apparatus of FIGURE 1 applies successive signals alternately to the heads 8 and 11, regardless of the interval between pulses. In some systems, this may not be desirable and it may be wished to record the majority of the pulses in one channel and record only those pulses in a second channel which occur within the recording time of a previously received pulse. Such a system is illustrated in FIGURE 2 in which input pulses are applied to an input lead 13 and are amplified by an amplifier 14. The output pulses developed by the amplifier 14 are applied to a lead 16 connected as one input lead to an "and" coincidence gate 17. The lead 16 is also connected via a lead 18 to one input circuit of a second and gate 19, and to the input circuit of a monostable multivibrator 21. When triggered by an incoming pulse, the multivibrator 21 switches to its unstable state of conduction for an interval approximately equal to the interval required for the recording heads to record an incoming pulse. The monostable multivibrator 21 is provided with a first output lead 22 connected to a second input circuit of the "and" gate 17 and is further provided with a second output lead 23 connected to a second input circuit of the "and" gate 19. An output circuit of the "and" gate 17 is coupled via a lead 24 to a winding 26 of a first magnetic recording head 27. Similarly an output lead 28 of the and-gate 19 is connected to a coil 29 of a magnetic recording head 31.

Under quiescent conditions, a positive voltage appears on the output lead 22 of the monostable multivibrator 21 and upon the appearance of a pulse on the input lead 13, the pulse is gated through the "and" gate 17 to the winding 26 of the recording head 27. Simultaneously, the pulse is applied to the monostable multivibrator 21 and causes it to switch to its unstable state of conduction for a period equal to that required to record the initial pulse. If a second pulse is applied to the input lead 13 during this interval, the positive voltage appearing on the output lead 23 of the monostable multivibrator 21 permits this pulse to pass through the "and" gate 19 and to be recorded by the recording head 31. During this same interval, the positive voltage is removed from the lead 22 so that the input pulse is not gated through the gate 17 to the recording head 27. In this modification of the invention, the stages of the monostable multivibrator 21 are D.C. coupled to the leads 22 and 23 so that a gating voltage appears on a lead during the entire interval that the vibrator is in a given state. Therefore, in the system illustrated, the length of the pulses applied to the heads 27 and 31 have a duration equal to the duration of the input pulses. If it is desired to sharpen these pulses, conventional pulse sharpening circuits may be inserted in the lead 16 and, more specifically, may take the form of a differentiating circuit followed by a half-wave rectifier or may constitute additional monostable multivibrators. On the other hand, if it is desired to record the information as received, the circuit of FIGURE 2 is completely acceptable while the circuit of FIGURE 1 would have to be modified. In such a modification, the stages of flip-flop 3 would be D.C. coupled to the leads 4 and 6 and these leads would be employed as gating connections to coincidence gates connected between the output circuit of the amplifier 2 and the coils 7 and 9 of the heads 8 and 11 respectively. Specifically, the circuit would then take the form of FIGURE 2 with the monostable multivibrator 21 being replaced by a flip-flop circuit.

The ability of the circuits of FIGURES 1 and 2 to resolve pulses occurring within the recording time of a recording head is limited to two pulses and if three or more such pulses occurred within a given recording time, these additional pulses would be applied to one of the heads during the interval that it was recording preceding pulses. The number of pulses occurring within a given time which the apparatus of the present invention may resolve, is determined only by the number of channels provided and, if in a given system as many as 100 pulses were anticipated within this predetermined interval, 100 distinct recording channels would have to be provided to accommodate the signals. As previously indicated, the present invention is primarily concerned with radiation detector circuits and in such random pulse system a situation is rarely encountered in which more than three pulses occur within the resolving time of the recording heads. In consequence, if a system is provided which permits successive switching between four recording channels, the probability of losing a pulse is extremely small and the loss of information resulting from such a loss of pulses is negligible. Thus, the present invention further contemplates a system which provides four recording channels and circuitry which controls the switching between these channels.

Figure 3:
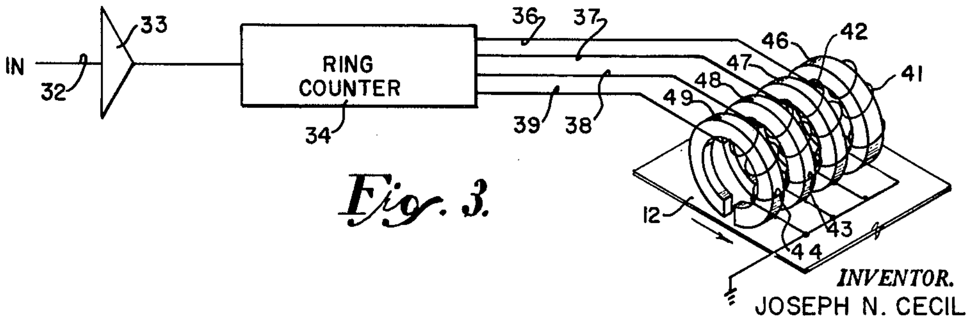
FIGURE 3 is a partial schematic and partial block diagram of a system for extending the basic circuit of FIGURE 1 for recording in more than two channels.

Referring now to FIGURE 3 of the accompanying drawings, there is illustrated a four-channel recording system including an input lead 32, a pulse amplifier 33, and a ring counter 34. The amplifier 33 is interposed between the input lead 32 and the ring counter 34 which has four output leads 36, 37, 38 and 39. The leads 36 through 39 are connected respectively to coils 41, 42, 43, and 44 of magnetic recording heads 46, 47, 48 and 49. The stages of the ring counter 34 are A.C. coupled to the leads 36 through 39 and a positive or negative pulse, if so desired, is developed on a different lead in response to the application of each individual pulse to the counter circuit 34. If it is desired to retain the original shape of the pulse information, the output leads 36 through 39 may be employed to gate pulses appearing at the output of amplifier 33 to the heads 46 through 49.

The ability of the circuits 1 through 3 to discriminate between incoming pulses is limited by the resolving time of the flip-flop circuit 3 in FIGURE 1, the monostable multivibrator circuit 21 in FIGURE 2 and a ring counter 34 of FIGURE 3. If each of these members is considered to have a resolving time of a half microsecond then it is apparent that the apparatus cannot distinguish between pulses occurring in time coincidence or at a rate greater than one-half microsecond. In certain systems, particularly in radiation detectors where two particles may possibly be received in overlapping time intervals, it may be necessary to determine the occurrence of such a situation so as to record two pulses rather than a single pulse. Such a system is illustrated in FIGURE 4 of the accompanying drawings.

Figure 4:
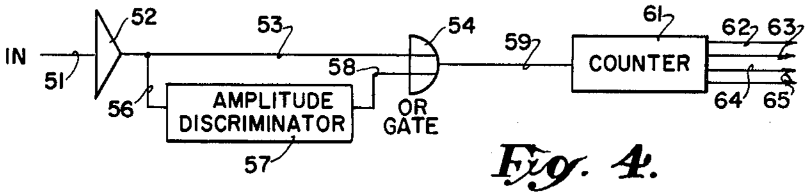
FIGURE 4 is a block diagram of a modification of the circuit of FIGURE 3 which permits the detection of coincidence pulses.

Referring now specifically to FIGURE 4, input pulses are applied to the lead 51 and coupled through a pulse amplifier 52 to a first input lead 53 of an "or" gate or buffer 54. The pulses appearing on the lead 53 are also coupled via a lead 56 to an amplitude discriminator 57 which produces an output pulse on a second input lead 58 to the "or" gate 54 when the amplitude of an input pulse is above the normal amplitude of the pulses received by the system. Specifically, the discriminator 57 may be designed to produce an output pulse on the lead 58 if the amplitude of the incoming pulse is one and one-fourth to one and one-half times that of a normal pulse. The pulses passed by the "or" gate 54 are applied via a lead 59 to a counter circuit 61, the stages of which are A.C. coupled to a plurality of output leads 62, 63, 64 and 65. The leads 62 through 65 are adapted to be connected to the energizing windings of magnetic recording or other suitable recording heads.

If a normal amplitude pulse is received, it is passed through the "or" gate 54 and causes a positive pulse to be applied to one of the output leads 62 through 65 of the counter. Successive pulses are applied to successive ones of these leads and therefore the pulses are recorded in distinct channels. If a pulse is received of greater than normal amplitude by the required amount to activate the amplitude discriminator 57, a pulse appears on the lead 58 and is gated through the "or" gate 54 to the counter thereby causing a second pulse to be recorded. In order for the counter to be able to respond to the second pulse produced by the amplitude discriminator 57, this pulse must appear after the initiating pulse by a time equal to the resolving time of the counter. If the inherent delay in the amplitude discriminator is insufficient to produce this pulse separation, then a delay line may be inserted in the lead 58 to produce the requisite time interval. Since in the system of FIGURE 4, the second pulse is delayed with respect to the first pulse, the record thus produced does not indicate that the pulses occur simultaneously in time. If it is necessary to preserve this information, the output voltage from the amplitude discriminator may be employed to gate information directly to a recording channel so that the time coincidence is preserved on the record, using a separate recording channel.

Figure 5:
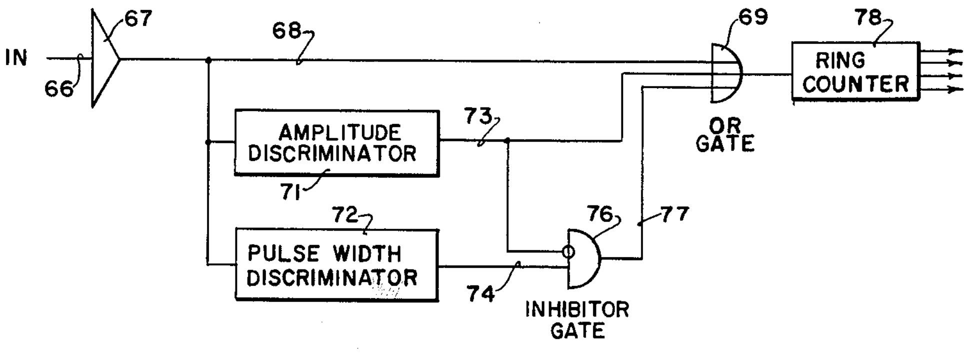
FIGURE 5 is a block diagram illustrating a modification of FIGURE 4 which permits the detection of continuous as well as overlapping pulses.

The apparatus thus far illustrated does not provide for the resolution of pulses which do not overlap in time but which occur within the resolving time of the counters or flip-flops. The amplitude discriminator circuit of FIGURE 4 accommodates any pair of pulses which overlap, even partially, while the counter and flip-flop circuits accommodate pulses occurring within one-half microsecond intervals of one another. A situation may arise in which the pulses do not coincide but occur substantially continuously in time. In order to accommodate this last possible situation, a circuit in accordance with FIGURE 5 may be employed which utilizes both an amplitude discrimination and a pulse width discrimination. In this system, input pulses are applied via a lead 66 and an amplifier 67 to a lead 68. The lead 68 is connected to one input circuit of an "or" gate 69 and further to an amplitude discriminator 71 and a pulse width discriminator 72. The amplitude discriminator 71 applies an output signal to a lead 73 when pulses above a predetermined amplitude are detected and the pulse width discriminator 72 applies a signal to a lead 74 if substantially no gap exists between incoming pulses so that the width of the pulse is greater than normal. The signal appearing on the output lead 74 is applied to an "inhibitor" gate 76 which receives an inhibiting input signal from a lead 73. Thus, if the width of the pulse is greater than normal but the two pulses overlap, the signal appearing on the lead 74 is blocked by the gate 76. However, if the pulses do not overlap but occur in very near time coincidence; that is, under a half miscrosecond, a signal is passed by the "inhibitor" gate 76 to a lead 77 connected to an input circuit of the "or" gate 79. The lead 73 from the amplitude discriminator 71 is also connected to the "or" gate 69. The circuit of FIGURE 5, therefore, may resolve pulses occurring in time coincidence or in very near time coincidence or pulses which occur at time intervals less than the resolving time of a ring counter 78 which is adapted to receive pulses from the "or" gate 79. If the delay through the amplitude discriminator 71 and pulse width discriminator 72 is not as great as the resolving time of the counter 78 then delay lines must be employed or a separate recorder head used.

In each of the circuits 3, 4 and 5, if it is desired to record as much pulse information as possible in a single channel, monostable multivibrators may be utilized in the counting element so that the counter is stepped along only if pulses occur at a rate greater than the system can accommodate in a single channel. Further, if it is desired to preserve the pulse information in its original form, the output leads from the ring counters may be employed to gate the information appearing on the input leads. The form of circuits illustrated in FIGURES 1, 3, 4 and 5 are particularly useful, however, since the same element that controls channel switching is employed as a pulse sharpening element to reduce the resolving time of each individual channel.

In order to reproduce the information recorded on the tape by the apparatus in FIGURES 1 through 5, individual play-back heads are required for each of the channels. Other than for this requirement, the remainder of the reproducing circuitry is flexible and the specific nature of the circuit depends connected to an input circuit of the "or" gate 79. The lead 73 from the amplitude discriminator 71 is also connected to the "or" gate 69. The circuit of FIGURE 5, therefore, may resolve pulses occurring in time coincidence or in very near time coincidence or pulses which occur at time intervals less than the resolving time of a ring counter 78 which is adapted to receive pulses from the "or" gate 79. If the delay through the amplitude discriminator 71 and pulse width discriminator 72 is not as great as the resolving time of the counter 78 then delay lines must be employed.

In each of the circuits 3, 4 and 5, if it is desired to record as much pulse information as possible in a single channel, monostable multivibrators may be utilized in the counting element so that the counter is stepped along only if pulses occur at a rate greater than the system can accommodate in a single channel. Further, if it is desired to preserve the pulse information in its original form, the output leads from the ring counters may be employed to gate the information appearing on the input leads. The form of circuits illustrated in FIGURES 1, 3, 4 and 5 are particularly useful, however, since the the same element that controls channel switching is employed as a pulse sharpening element to reduce the resolving time of each individual channel.

Figure 6:
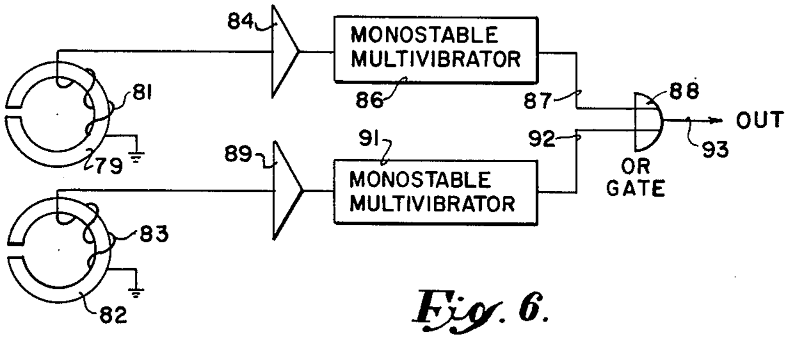
FIGURE 6 is a partial schematic and partial block diagram of a playback system to be employed with the systems of FIGURES 1 and 2.

In order to reproduce the information recorded on the tape by the apparatus in FIGURES 1 through 5, individual playback heads are required for each of the channels. Other than for this requirement, the remainder of the reproducing circuitry is flexible and the specific nature of the circuit depends upon the instrument receiving pulses from the system. For instance, if it is desired to display the information on a cathode ray oscilloscope, the reproducing circuit could conveniently employ a single amplifier fed from each of the reproducing heads. On the other hand, if the information is subsequently to be applied to a counting rate meter, individual amplifying and pulse sharpening circuits are desirable. Such a circuit is illustrated in FIGURE 6 and comprises a reproducing head 79 having a winding 81 and a reproducing head 82 having a winding 83. Only two heads are illustrated in this figure, although it is understood that the number of heads in the reproducing system must equal the number of heads in the recording system. The coil 81 is coupled through an amplifier 84 to a monostable multivibrator 86 or other pulse sharpening circuit. The output circuit of the element 86 is coupled to a lead 87 which constitutes one input lead to an "or" gate or buffer 88. The winding 83 of the head 88 is coupled via an amplifier 89 to a monostable multivibrator 91 or other pulse sharpening circuit and the output circuit of the multivibrator 91 is applied to a second input lead 92 of the "or" gate 88. The "or" gate 88 is provided with an output lead 93 which, in the system under consideration, would be coupled to a counting rate meter. Thus, in this system, the output signals from the amplifier are connected in parallel after pulse sharpening rather than the reproducing heads being connected in parallel as may be the case if a pulse display system is to be energized.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An apparatus for recording pulses applied to an electric circuit comprising a plurality of recording channels, means for sequentially and successively connecting each of said recording channels to said circuit in pulse recording relationship, said means including control means responsive to each of the pulses to be recorded to change the channel connected to said circuit.

2. An apparatus for recording pulses applied to an electric circuit comprising a plurality of recording channels, and means for sequentially and successively connecting each of said recording channels to said circuit in pulse recording relationship, said means including control means responsive to pulses to be recorded occurring substantially in time coincidence and to successive pulses to effect a change in the channel connected to said circuit.

3. Apparatus for recording electrical pulses on a movable tape, said apparatus comprising pulse receiving means including an amplifier having a single pulse output circuit, a plurality of recording means arranged across said movable tape and having separate input circuits, and gating means having a single input connected to said amplifier pulse output circuit and having a plurality of output circuits each connected to the input circuit of a different respective one of said plurality of recording means, said gating means being responsive to successive pulses received from said amplifier in a manner to apply such received pulses successively and sequentially each to a different respective one of said recording means.

4. The apparatus for recording pulses applied to an electric circuit specified in claim 1 in which the means for sequentially and successively connecting each of said recording channels to said circuit comprises a ring counter having a plurality of output circuits with each of the output circuits connected to a different one of the recording channels, the ring counter sequentially and successively applying signals to said output circuits in response to input pulses.

5. The apparatus specified in claim 4 including a pulse height discriminator for producing a pulse when the height of a pulse applied thereto is above a predetermined level, means for applying the input pulses to said discriminator, and means for applying pulses produced by said discriminator to said ring counter.

References Cited by the Examiner

UNITED STATES PATENTS

| | | | |
|---|---|---|---|
| 2,611,813 | 9/52 | Sharpless et al. | 340—172.5 |
| 2,657,377 | 10/53 | Gray | 340—174.1 |
| 2,698,875 | 1/55 | Greenwood | 340—174.1 X |
| 2,869,243 | 11/58 | Kaplan | 340—174.1 |
| 2,874,214 | 2/59 | Anderson | 340—174.1 |
| 2,876,058 | 3/59 | Kenosian et al. | 346—74 |
| 2,923,773 | 2/60 | Reynolds | 179—15.55 |
| 2,951,242 | 8/60 | Fisher et al. | 340—174.1 |

IRVING L. SRAGOW, *Primary Examiner.*

STEPHEN W. CAPELLI, *Examiner.*